Figure 1:
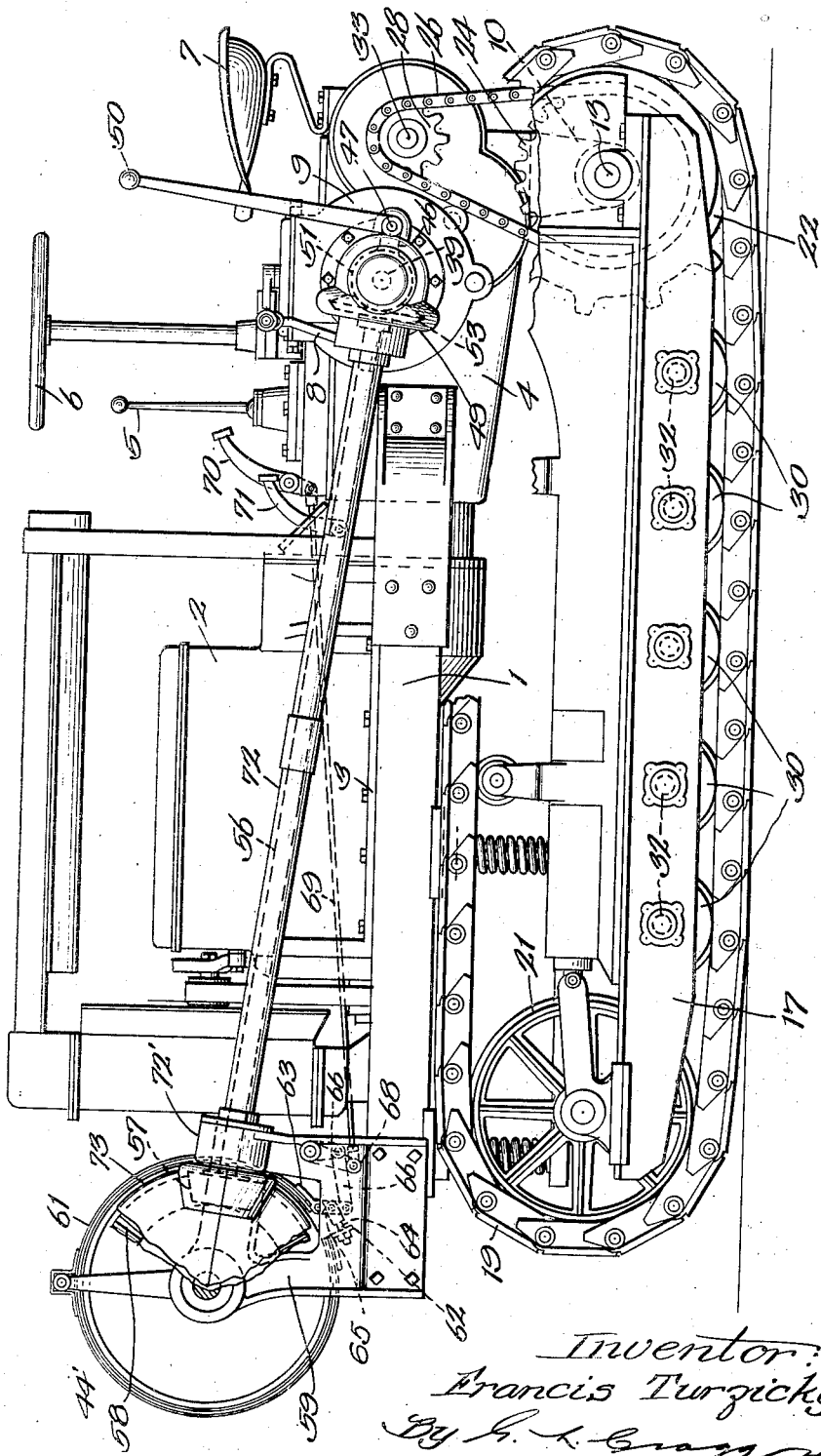

Nov. 22, 1932.　　　F. TURZICKY　　　1,888,644
AUTOMOTIVE VEHICLE
Filed Aug. 19, 1929　　4 Sheets-Sheet 1

Inventor:
Francis Turzicky

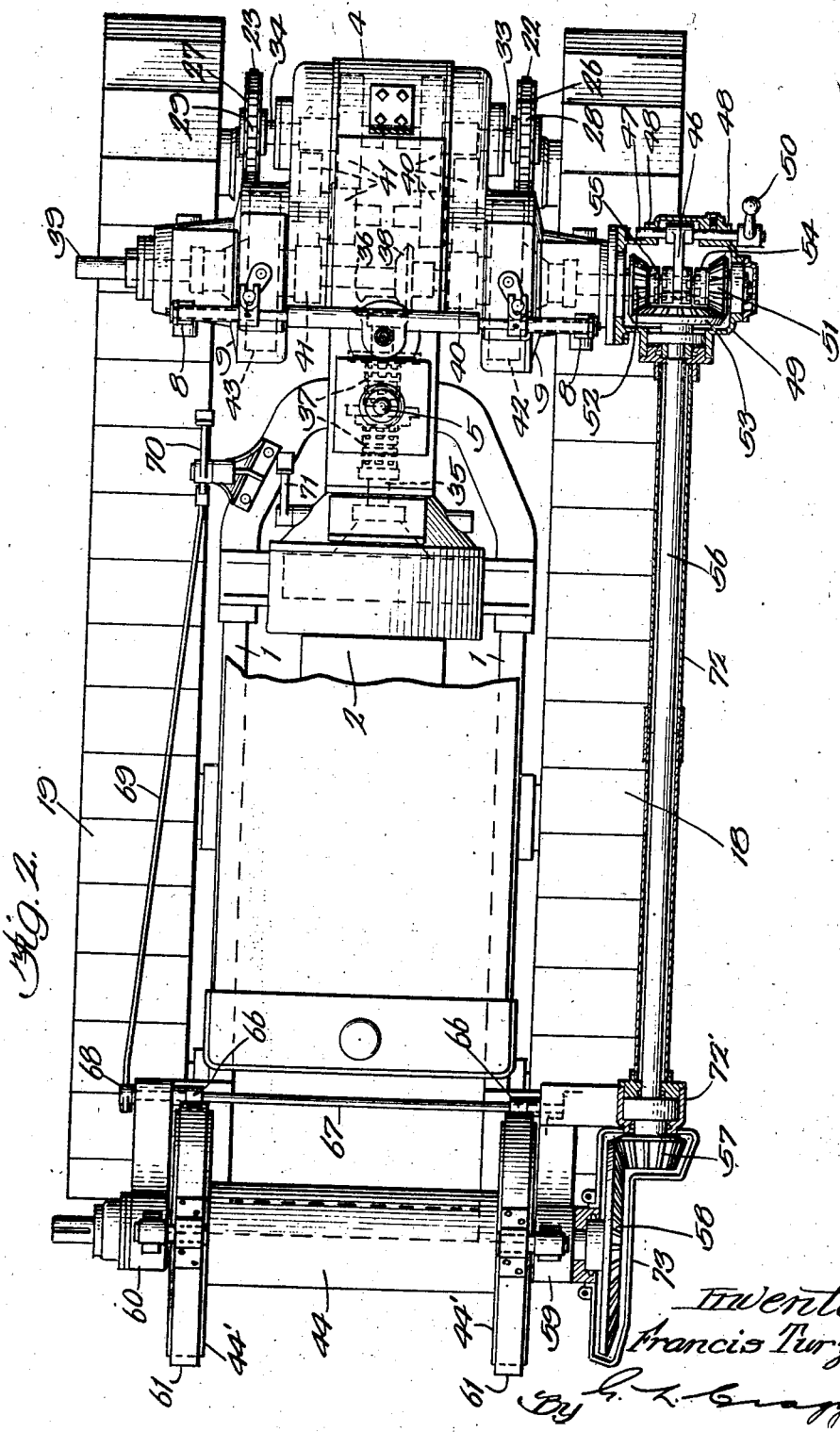

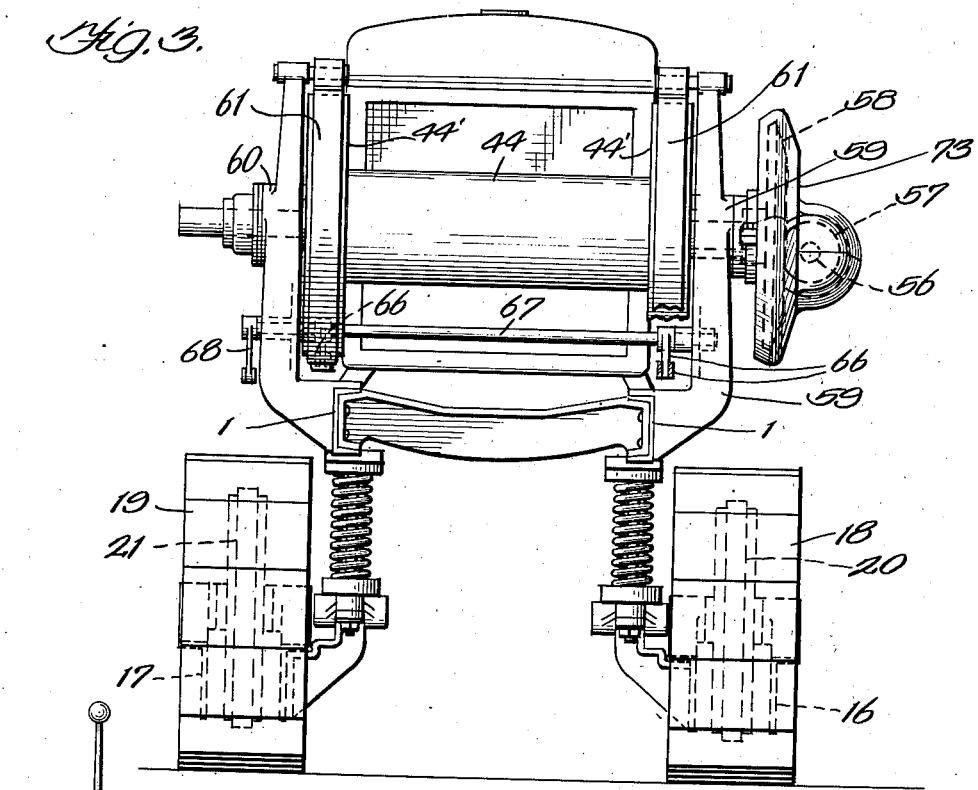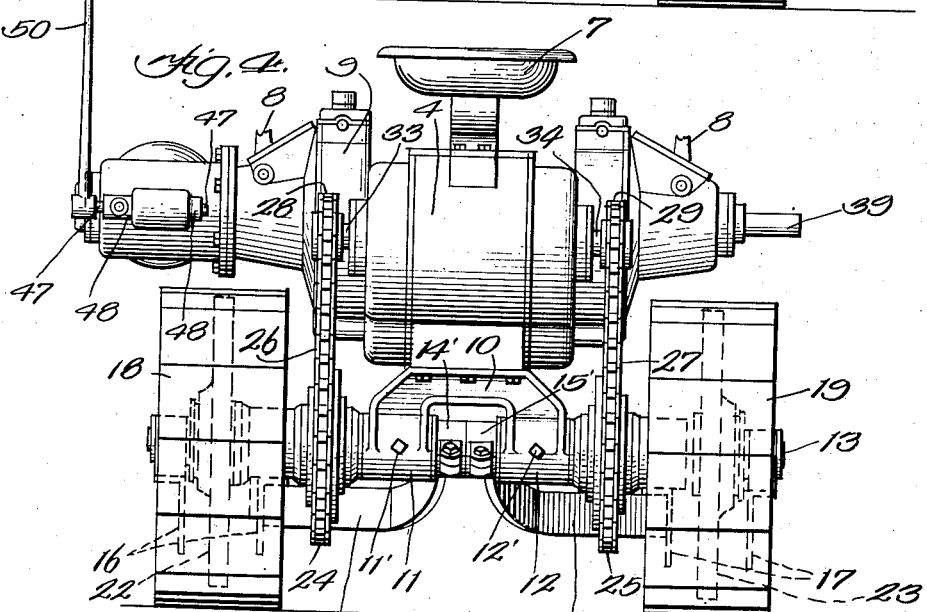

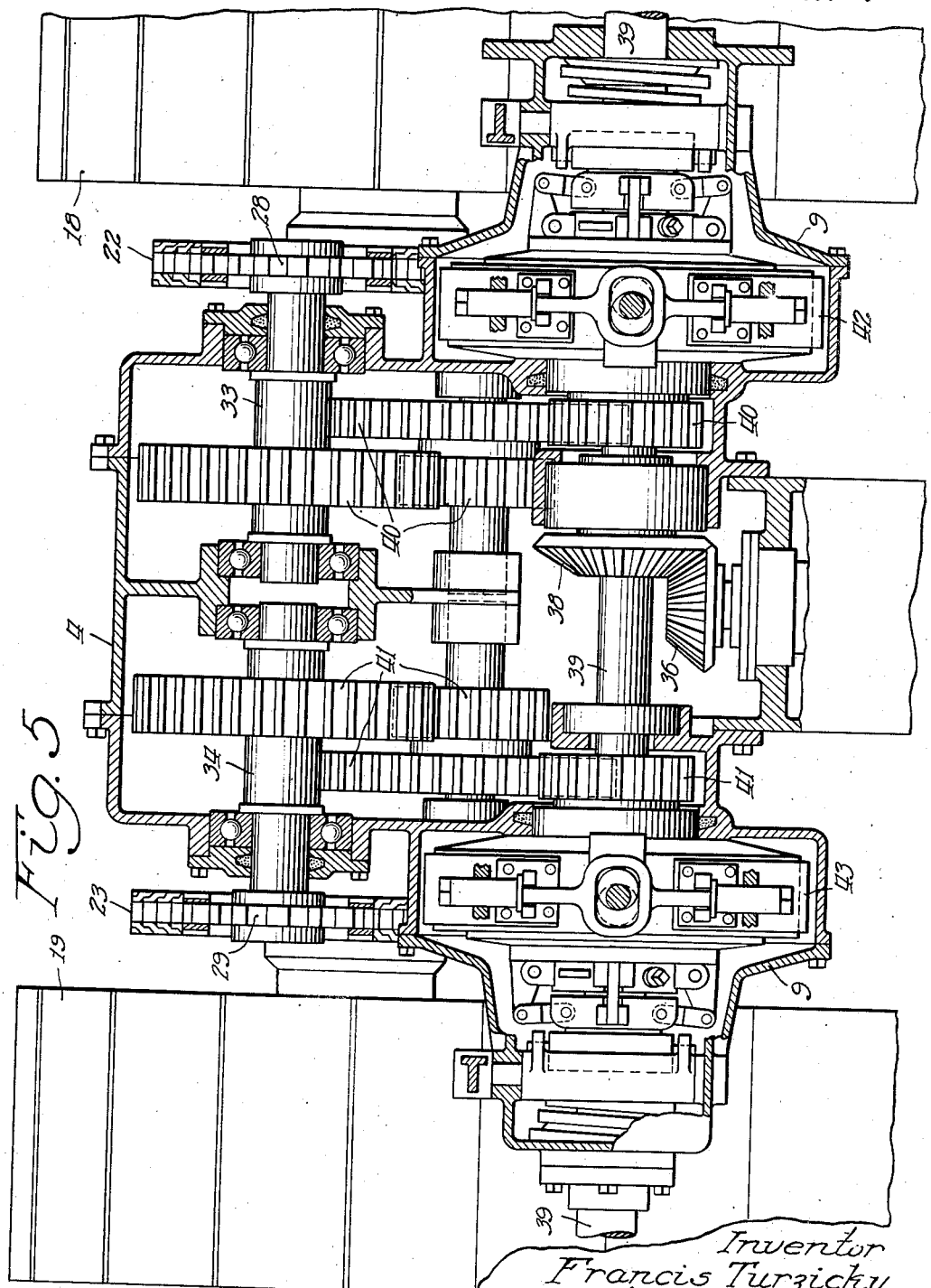

Patented Nov. 22, 1932

1,888,644

UNITED STATES PATENT OFFICE

FRANCIS TURZICKY, OF CHICAGO, ILLINOIS, ASSIGNOR TO HENRY E. BULLOCK, OF CHICAGO, ILLINOIS

AUTOMOTIVE VEHICLE

Application filed August 19, 1929. Serial No. 386,914.

My invention relates to automotive vehicles and has for its object the provision of a windlass thereon which may be operable by the engine that is employed to propel the vehicle. The vehicle of my invention is inclusive of clutching mechanism whereby the windlass may be brought into and out of driven relation with the engine. Reversing mechanism is also associated with the windlass whereby the direction of rotation of the windlass may be reversed without the necessity of operating the reversing gearing that serves to change the direction of the vehicle.

My invention is of particular service in connection with endless chain track tractors. In carrying out my invention in connection with such a tractor, I employ a jack shaft through which the vehicle may be propelled and through which, also, the windlass may be driven when the clutching mechanism is adjusted to couple the windlass with the engine.

I will explain my invention more fully by reference to the accompanying drawings in which Fig. 1 is a side view of a tractor or vehicle made in accordance with the preferred embodiment of the invention, parts being broken away; Fig. 2 is a plan view of the vehicle shown in Fig. 1, also with parts broken away and with parts in section; Fig. 3 is a front view; and Fig. 4 is a rear view; and Figure 5 is a plan view, partially in section, with parts broken away, and showing in detail a portion of the gearing shown in dotted lines at the upper part of Figure 2.

The vehicle body is inclusive of two longitudinal sills 1, which are preferably made of iron. The casing 2 of the internal combustion engine is mounted upon the sills. The casing 4 has the gearing between the internal combustion engine and the endless tracks and is interposed between the rear ends of said sills which are bolted to this casing. I have illustrated a speed changing and reversing lever 5, the steering wheel 6 and the operator's seat 7 upon the casing 4. A lever 8 of the steering clutch mechanism is journaled upon a continuation 9 of the casing 4, this casing continuation enclosing the steering gearing and braking mechanism that pertains to one of the endless tracks.

The rear casing portion 4 of the vehicle body carries a depending bracket 10 which is bolted to the bottom of the casing 4. This bracket is in the form of an inverted U, the sides of the U terminating in horizontally aligned mounting sleeves 11 and 12, which extend transversely of the vehicle and are at the rear end thereof. A shaft 13 passes through these mounting sleeves and extends from one side of the entire vehicle to the other. This shaft constitutes a bearing for the arms 14 and 15 which are provided upon and constitute upwardly extending projections of the truck frames 16 and 17. These truck frames are laterally beyond the body of the vehicle, said arms extending rearwardly, inwardly and upwardly to have bearing upon the shaft.

The truck frames 16 and 17 are respectively surrounded by the endless chain tracks 18, 19. These tracks are horizontally elongated and respectively pass over the idler wheels 20 and 21 and the driving sprocket wheels 22 and 23, which are disposed at the ends of the tracks, as illustrated. The driving sprocket wheels are journaled upon the shaft 13 and are independently rotatable. These driving sprocket wheels are coaxial with and respectively in fixed relation to the sprocket wheels 24 and 25. The sprocket chains 26 and 27 are, respectively, in driving relation to the sprocket wheels 25 and are respectively driven by the sprocket wheels 28 and 29 which are driven by the engine through the intermediation of gearing that is enclosed within the casing 4. The truck wheels 30 are arranged in pairs upon shafts 32 which are respectively in fixed relation thereto. These shafts are arranged horizontally and crosswise of the vehicle and are journaled in the truck frames 16 and 17, respectively. Said wheels turn upon the inner top sides of the bottom stretches of the endless chain tracks to which they respectively relate.

The sprocket wheels 28 are provided upon the aligned independently rotatable horizontal shafts 33, 34 that are arranged transversely of the vehicle at the rear thereof. These shafts are driven from the engine shaft 35 through the intermediation of suitable gearing, as is well understood by those skilled in the art. I have diagrammatically illustrated a transmission mechanism intervening between engine shaft and the shafts 33 and 34 which is inclusive of a beveled pinion 36 that is driven by the engine through the intermediation of the usual speed changing and reversing gearing, generally indicated at 37, this gearing being governed by the lever 5 in accordance with common practice. The beveled pinion 36 is thus operable at varying speeds and in reverse directions. Whatever movements are imparted to this beveled pinion through the intermediation of the gearing at 37 is similarly imparted to the beveled pinion 38 in mesh therewith, but rotating oppositely. The bevel pinion 38 is fixed upon a jack shaft 39 which extends transversely of the vehicle at the rear thereof and beyond its longitudinal sides. Usual gearing, illustrated at 40, 41, is interposed between the jack shaft and the aligned shafts 33 and 34 for turning these shafts and effecting propulsion of the vehicle. Suitable clutching mechanisms, generally indicated at 42, 43, intervene between the shaft 39 and the gearing 40 and 41 to permit the differential operation of the sprocket wheels 28, 29. I employ the shaft 39, and the gearing between it and the engine, for operating the windlass 44 at desired rates of speed and direction. To this end, I provide a clutch member 45 upon the shaft 39 and is assembled therewith as to be movable therealong in selected positions while being turned thereby. That is, said clutch member is splined upon this shaft. The clutch member is desirable formed with an intermediate annular groove which receives the fork 46 which is movable along the shaft 39 to move the clutch member along the shaft. Said fork is fixed upon a rod 47 which is movable lengthwise of the shaft 39 within bearings 48 that are formed upon a gear casing 49. The rod 47 has a handle 50 by which it may be moved along the shaft 39. Two beveled pinions 51, 52 are mounted to turn freely upon the shaft 39. These beveled pinions are in mesh with the beveled gear 53. Clutch members 54 and 55 are fixed upon the inner ends of the beveled pinions 51 and 52. The inner faces of these clutch members are serrated, as are the opposing faces of the clutch member 45, whereby the latter clutch member may be placed in turning engagement with either of the other clutch members according to the position of the rod 47. The bevel gear 53 is thus rotatable in one direction or the other according to the clutch member that is engaged by the clutch member 45. The speed of rotation of the beveled gear 53 is determined by the speed of rotation of the shaft 39, which, in turn, is determined by the position of the gear shift lever 5. The direction in which the beveled gear 53 is turned may also be regulated by the position of the said lever. The beveled gear 53 is provided upon a shaft 56 which extends lengthwise of the vehicle upon one side thereof and above the endless chain track at this vehicle side. The shaft 56 carries a beveled pinion 57, at its forward end, this beveled pinion being in mesh with a bevel gear 58 which is fixed upon and coaxial with the drum of the windlass 44. The windlass is thus operated at speeds proportionately to the speed of the shaft 39 and in a corresponding direction, the same gear shift lever 5 which controls the speed and direction of the shaft 39 correspondingly controlling the speed and direction of rotation of the windlass. The windlass is journaled upon the brackets 59 and 60 which are carried upon the forward ends of the sills 1. The end walls 44' of the windlass also serve as brake drums, whereby the motion of the windlass may be checked. Brake straps or shoes 61 surround the brake drums 44'. Each brake strap carries a bracket 62, at one end, and another bracket 63 at the other end. A link 64 connects each bracket 62 with the intermediate portion of a link 65 which is pivoted, at one end, to the corresponding bracket 63. The other end of the link 65 is connected by means of a linkage 66 with a brake rod 67. A crank 68 is fixed upon one end of the brake rod and is connected by a brake lever 69 with the brake pedal 70. The braking mechanism just described is provided especially for the windlass, and the pedal 70 thereof is preferably located in the same region with the clutch pedal 71 that is employed in controlling the operation of the vehicle.

Suitable housing may be employed for the shaft 56 and the gears 57 and 58, this housing including a tubular portion 72 which is a continuation of the gear casing 49. The casing 73, which surrounds the gears 57 and 58, is a continuation of the enlargement 72' of the tubular housing portion 72.

The windlass and the mechanism that is especially provided to couple the same with the shaft 39 are removable, the gear casing 49 being detachably applicable to the casing 4, as indicated by the bolts.

In accordance with common practice, speed changing gearing at 37 is adapted to impart the three different speeds, forward, to the shaft 39. The windlass may be turned at three speeds forwardly or three speeds backwardly according to the clutching position of the clutch member 45.

Changes may be made without departing from the invention.

Having thus described my invention, I claim:

In a tractor, a body, a variable speed gearing mounted on one end of the body, a jack shaft transverse the body directly connected to the variable speed gearing and operable by the latter, driving wheels associated by gearing with said jack shaft, clutch mechanism between the jack shaft and each driving wheel, a member splined to rotate with the jack shaft and slidable thereon to positively engage either of two idler bevel pinions mounted on the shaft, a bevel gear mounted separately from the jack shaft to be turned in either direction by one of the idler pinions, a shaft fixed to be rotated by the bevel gear, and mechanism at the other end of the body connected with and operable by the latter shaft, whereby the mechanism may be driven by the variable speed gearing in either direction.

In witness whereof, I hereunto subscribe my name.

FRANCIS TURZICKY.